United States Patent
Winetraub et al.

(10) Patent No.: US 12,361,656 B2
(45) Date of Patent: Jul. 15, 2025

(54) HIGH RESOLUTION ALIGNMENT OF 3D IMAGING WITH 2D IMAGING

(71) Applicant: The Board of Trustees of the Leland Stanford Junior University, Stanford, CA (US)

(72) Inventors: Yonatan Winetraub, Mountain View, CA (US); Edwin Yuan, Stanford, CA (US); Itamar Terem, Menlo Park, CA (US); Caroline Yu, Castro Valley, CA (US); Adam de la Zerda, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 497 days.

(21) Appl. No.: 17/601,368

(22) PCT Filed: Apr. 10, 2020

(86) PCT No.: PCT/US2020/027735
§ 371 (c)(1),
(2) Date: Oct. 4, 2021

(87) PCT Pub. No.: WO2020/210679
PCT Pub. Date: Oct. 15, 2020

(65) Prior Publication Data
US 2022/0198689 A1    Jun. 23, 2022

Related U.S. Application Data

(60) Provisional application No. 62/832,093, filed on Apr. 10, 2019.

(51) Int. Cl.
*G06K 9/00* (2022.01)
*G01N 21/64* (2006.01)
(Continued)

(52) U.S. Cl.
CPC ........ *G06T 19/20* (2013.01); *G01N 21/6428* (2013.01); *G01N 21/6458* (2013.01);
(Continued)

(58) Field of Classification Search
CPC ........................... G02B 21/367; G06V 20/698
See application file for complete search history.

(56) References Cited

U.S. PATENT DOCUMENTS

| 8,386,015 B2 | 2/2013 | Kamen |
| 8,764,189 B2 | 7/2014 | Stetson |

(Continued)

FOREIGN PATENT DOCUMENTS

| DE | 102010042073 | 4/2011 | |
| DE | 102010042073 A1 * | 4/2011 | ............ A61B 5/055 |

OTHER PUBLICATIONS

Toth, Cynthia A., et al. "A comparison of retinal morphology viewed by optical coherence tomography and by light microscopy." Archives of ophthalmology 115.11 (1997): 1425-1428. (Year: 1997).*
(Continued)

*Primary Examiner* — Gregory A Morse
*Assistant Examiner* — Owais Iqbal Memon
(74) *Attorney, Agent, or Firm* — LUMEN PATENT FIRM

(57) ABSTRACT

Alignment of a 2D image to a corresponding 3D image is provided by writing a pattern into a 3D sample. The pattern is at known positions in the 3D image, and provides visible reference features in the 2D image. This permits accurate determination of the plane in the 3D image that corresponds to the 2D image.

15 Claims, 7 Drawing Sheets

(51) Int. Cl.

| | |
|---|---|
| *G06F 18/214* | (2023.01) |
| *G06T 7/33* | (2017.01) |
| *G06T 19/20* | (2011.01) |
| *G06V 10/75* | (2022.01) |
| *G06V 20/64* | (2022.01) |
| *G06V 20/69* | (2022.01) |

(52) U.S. Cl.
CPC ............ *G06F 18/214* (2023.01); *G06T 7/337* (2017.01); *G06V 10/757* (2022.01); *G06V 20/64* (2022.01); *G06V 20/647* (2022.01); *G06V 20/69* (2022.01); *G01N 2021/6439* (2013.01); *G06T 2200/04* (2013.01); *G06T 2207/10101* (2013.01); *G06T 2207/20081* (2013.01); *G06T 2207/30004* (2013.01)

(56) References Cited

U.S. PATENT DOCUMENTS

| | | | |
|---|---|---|---|
| 9,940,719 | B2 | 4/2018 | Kneepkens |
| 2011/0075946 | A1 | 3/2011 | Buckland |
| 2011/0176716 | A1* | 7/2011 | Kim ....................... A61B 3/102 382/131 |
| 2013/0121548 | A1 | 5/2013 | Kovalan |
| 2014/0152647 | A1 | 6/2014 | Tao |
| 2015/0123970 | A1 | 5/2015 | Gyger |
| 2016/0038121 | A1 | 2/2016 | Waechter-Stehle |
| 2018/0300947 | A1 | 10/2018 | Alkhatib |
| 2020/0035350 | A1* | 1/2020 | Sullivan ................ G06N 20/00 |

OTHER PUBLICATIONS

Corbett, Alexander D., et al. "Microscope calibration using laser written fluorescence." Optics express 26.17 (2018): 21887-21899. (Year: 2018).*

Puri, Tanuj. "A Method for Accurate Spatial Registration of PET Images and Histopathology Slices: 9th National Cancer Research Institute Cancer Conference, 2013." 9th National Cancer Research Institute Cancer Conference, 2013. 2013. (Year: 2013).*

Caldas-Magalhaes, Joana, et al. "Validation of imaging with pathology in laryngeal cancer: accuracy of the registration methodology." International Journal of Radiation Oncology* Biology* Physics 82.2 (2012): e289-e298. (Year: 2012).*

Gloesmann et al., "Histologic correlation of pig retina radial stratification with ultrahigh-resolution optical coherence tomography", 2003, Investigative Ophthalmology & Visual Science v44n4.

Boscaini et al., "Learning shape correspondence with anisotropic convolutional neural networks", 2016, arXiv:1605.06437v1.

* cited by examiner

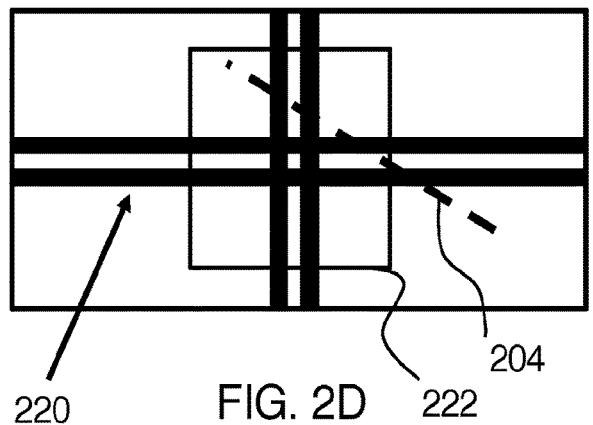
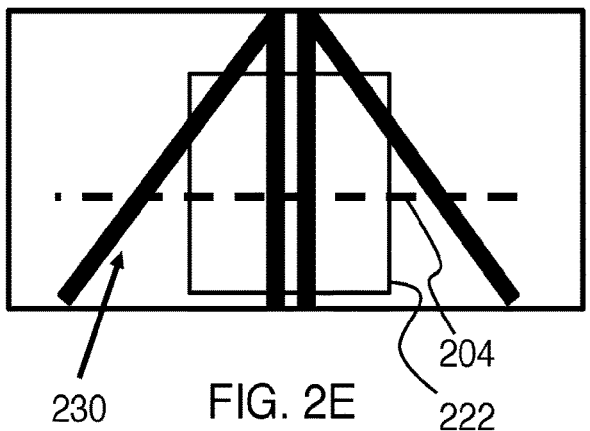
FIG. 2D  FIG. 2E
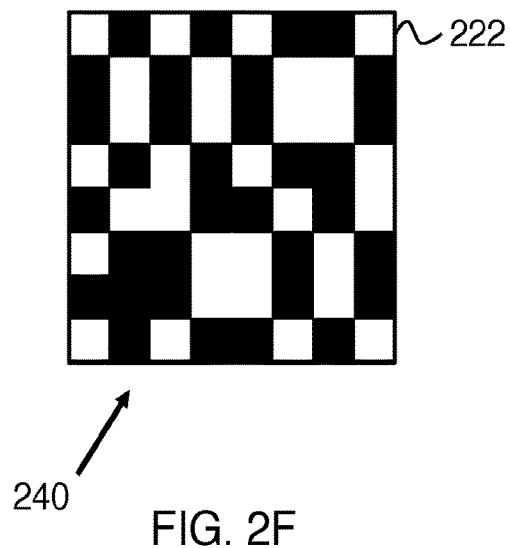
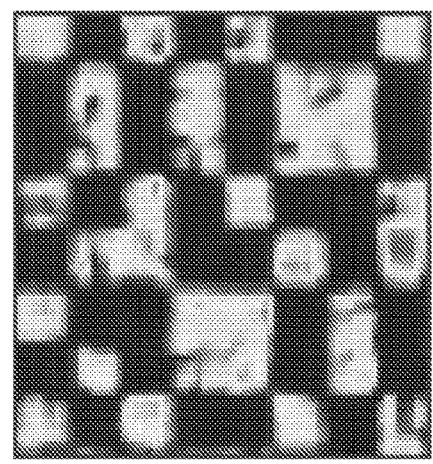
FIG. 2F  FIG. 2G

HIGH RESOLUTION ALIGNMENT OF 3D IMAGING WITH 2D IMAGING

CROSS-REFERENCE TO RELATED APPLICATIONS

This application is a 371 of PCT application PCT/US2020/027735 filed Apr. 10, 2020. PCT application PCT/US2020/027735 claims the benefit of U.S. Provisional application 62/832,093 filed Apr. 10, 2019.

STATEMENT OF GOVERNMENT SPONSORED SUPPORT

This invention was made with Government support under contract 1434465 awarded by the National Science Foundation. The Government has certain rights in the invention.

FIELD OF THE INVENTION

This invention relates to alignment of 3D imaging with corresponding 2D imaging.

BACKGROUND

Optical Coherence Tomography (OCT) is a non-invasive method to image tissue at cellular-level resolution. Many applications of cancer tumor detection or tumor margin classification using OCT images have been developed. However, in clinical practice, the gold standard against which these methods are compared is histo-pathological sections of the same area. One key problem that remains is how to find the same OCT image that corresponds to a given histo-pathology section at single-cell resolution. Accordingly, it would be an advance in the art to provide sufficiently accurate alignment of 2D images to corresponding 3D images.

SUMMARY

Alignment of a 2D image to a corresponding 3D image is provided by writing a pattern into a 3D sample. The pattern is at known positions in the 3D image, and provides visible reference features in the 2D image. This permits accurate determination of the plane in the 3D image that corresponds to the 2D image.

For example, the tissue can be stained with fluorescent dye (or embedded in a gel stained with fluorescent dye), which can then be photobleached using the OCT laser. After scanning the tissue, the laser power is increased to photobleach a specific pattern/barcode onto the tissue. The tissue is then sent to undergo normal histo-pathology sectioning. The resulting bar-code can be read off the pathology section allowing for the alignment of the histology section to the corresponding slice of the OCT volume with an unprecedented accuracy of less than 20 microns.

Accurate alignment of OCT and histology sections enables many applications that arise from having histological information alongside OCT structural and temporal information. One application is to use machine learning to directly predict histological images from a given OCT image, enabling non-invasive histology-like images. In one embodiment, the technique allows for the creation of a dataset of paired OCT and histology images necessary for such an application. A second application is to combine the structural and dynamic information that OCT allows for (non-invasive in-vivo longitudinal imaging), with metabolic/protein information from histo-chemistry. For example, one could image the activities of particular cells in a tumor over time in OCT, and then pair that information with molecular information from a histological section, which is from a single time point.

BRIEF DESCRIPTION OF THE DRAWINGS

FIGS. 2D-G show further examples of suitable predetermined patterns.

DETAILED DESCRIPTION

Section A of this description describes general principles of embodiments of the invention, and also summarizes some aspects of a detailed experimental investigation where the 2D imaging is histology and the 3D imaging is optical coherence tomography. Section B of this description provides various further details relating to the above-referenced experimental investigation.

A) General Principles

Figure 1:
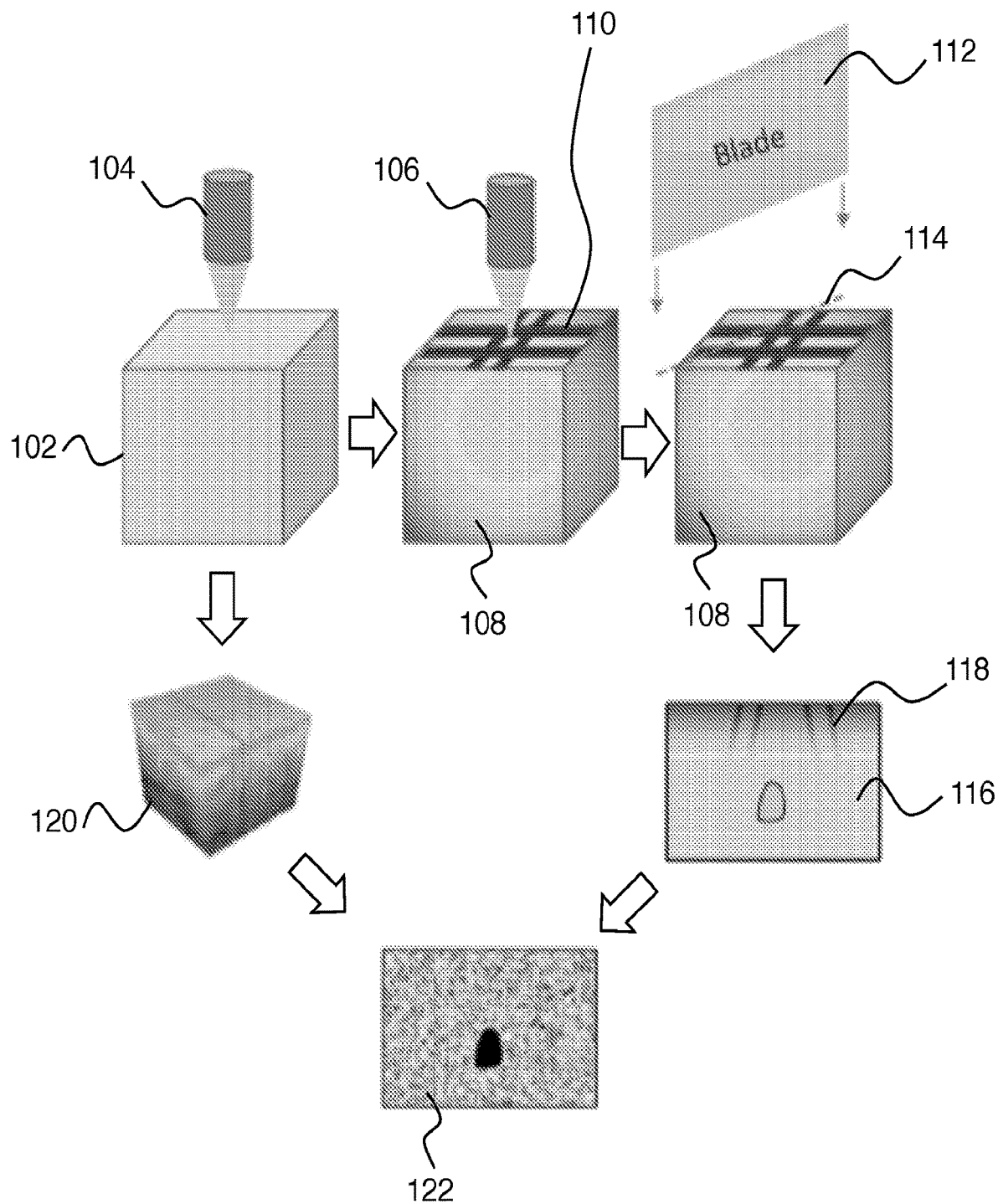
FIG. 1 shows an exemplary embodiment of the invention.

FIG. 1 shows an exemplary embodiment of the invention. Here a method of aligning a 2D image to a corresponding 3D image includes the following steps:

providing a 3D sample 102;

writing a predetermined pattern 110 within the 3D sample 102 (e.g., with an optical beam 106). The result is a patterned sample 108;

cutting a 2D slice from the 3D sample after the predetermined pattern is present (e.g., by cutting with a blade along line 114);

imaging the 3D sample to provide a 3D image 120 with a first imaging modality (e.g., with an optical coherence tomography system schematically shown by 104). This 3D imaging can be done either before or after the predetermined pattern is written; since patterning can take a considerable amount of time (around 13 minutes total), imaging before patterning guarantees the tissue is in better condition and wasn't degraded much before being imaged. Doing the patterning first makes it easier for automation, as patterning may involve changing the optical configuration, therefore doing it first allows the operator to complete the task, and leave the room while the OCT scanner completes scanning the tissue which may take up to an hour.

imaging the 2D slice to provide a 2D image 116 with a second imaging modality, wherein the predetermined pattern provides reference features 118 in the 2D image; and automatically determining a 2D section 122 of the 3D image that corresponds to the 2D image 116 using the reference features 118 in the 2D image 116.

Although the example given herein uses optical coherence tomography (OCT) as the first imaging modality and optical microscopy of a stained tissue specimen (i.e., histology) as the second imaging modality, other imaging modalities can also be employed. Thus suitable first imaging modalities include, but are not limited to: intravital microscopy, lipid-cleared 3D imaging, 3D optical imaging, optical coherence tomography, photoacoustic imaging, two photon microscopy, confocal microscopy, diffusive optical imaging and magnetic resonance imaging. One example of "lipid-cleared 3D imaging" is the CLARITY method, short for Clear Lipid-exchanged Anatomically Rigid Imaging/immunostaining-compatible Tissue hYdrogel. The CLARITY method was first reported on by Chung et al. ("Structural and molecular interrogation of intact biological systems. *Nature.* 2013; 497(7449):332-337). Suitable second imaging modalities include, but are not limited to: histological imaging, non-histological imaging, optical microscopy, electron microscopy (e.g., using cathode luminescence dyes), and mass spectroscopy imaging.

Histological imaging can include immunohistochemistry, H&E (Hematoxylin and eosin) staining, CODEX™ (CO Detection by indEXing), laser capture microdissection, and mass spectroscopy imaging.

Although the methods described above provide alignment of a 2D image to a corresponding 3D image, the idea can be extended to align two 3D images to each other. For example, given a first 3D image and a second 3D image, two or more planes in the second 3D image can be aligned to the first 3D image as described above. This is useful in various cases. A first case is where the two modalities don't exist in the same device, for example aligning OCT to 2 photon microscopy. A second case is if one modality requires chemical change to do the imaging: for example CLARITY destroys the tissue, so we can align live OCT 3D volume to 3D volume taken by CLARITY. A third case is if the modalities require physical change to do the imaging: for example in vivo 3D volume to ex-vivo 3D registration.

The writing of a predetermined pattern within the 3D sample can include performing a sensitization method followed by optically writing the predetermined pattern in a sensitized sample. Suitable sensitization methods include but are not limited to: providing a genetic fluorescence marker to a biological sample, encasing the sample in a fluorescent gel, and staining the sample with a fluorescent stain. We can use another mechanism for photo-switchable agents entirely. For example, using spin orientation in magnetic thin films that can be switched by a laser.

The sample can be an ex vivo biological sample, an in vivo biological sample, or a non-biological sample.

Applications: The above described method can be used to characterize sample distortion from cutting the 2D slice and/or from performing the second imaging modality. This can be a time-dependent characterization of dynamic distortion.

This work has numerous additional applications.
1) Machine learning can provide synthetic histology as described below in connection with FIG. 4.
2) We can better understand non-uniform sample deformation (for example, due to chemical processing like CLARITY, or mechanical damage like studying trauma injury).
3) We can provide motion correction & distortion of 3D structures to a reference alignment using the pattern. This can be important to do during an imaging procedure.
4) Using contrast agents, we can track cells in vivo where dynamics can be observed and correlate those cells with genetic expression ex-vivo for drug development.
5) We can correlate structures that are visible in OCT to ground truth histology, to verify that the structures seen in OCT are 'real'.

Applications outside the medical field are also possible.
6) We can track deformation in soft-materials processing (material sciences, stress, shear).
7) Given a series of 2D sections, we can reconstruct a 3D volume using this method. Reverse assembly after the cuts.
8) This method can be used as a calibration machine to very accurately calibrate slicing or cutting machines on realistic samples.

The following description relates to a specific example where the first imaging modality is optical coherence tomography and the second image modality is histology. However, as indicated above, the ideas of this example are more generally applicable.

An important aspect of this example is the alignment. Here our main alignment assumption is that the histological cut can be approximated as a 2D plane going through the 3D volume. During the OCT scanning phase we use a laser to photobleach a pattern including N horizontal lines (along the x direction) and M vertical lines (along the y direction). Thus the top surface of the sample is taken to be in the x-y plane.

Figures 2A, 2B:
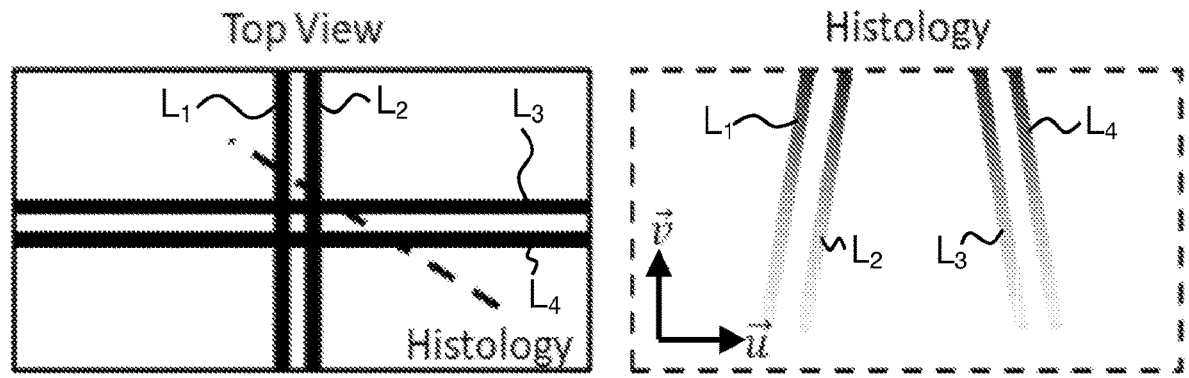
FIGS. 2A-B are top and side views of an exemplary predetermined pattern.

FIGS. 2A-B show a simple example of such a pattern. Here FIG. 2A is a top view showing a pattern having four lines $L_1$, $L_2$, $L_3$, and $L_4$, and the dashed line on FIG. 2A is the histological cut. FIG. 2B is in the plane of the histological cut. Notice that the histology section represents a cut where $\vec{u}$ is in the x-y plane and $\vec{v}$ is mostly parallel to z. Each photobleach line actually photobleaches the entire plane under the corresponding line into the gel (along the z direction). This is why $L_1$, $L_2$, $L_3$, $L_4$ appear as lines in the histology plane. These lines can be tilted (e.g., as shown on FIG. 2B) if the histology plane isn't exactly perpendicular to the top surface of the sample.

The histology plane estimation problem is mathematically formulated by parametrizing the histology plane and then solving for the parameters of that plane. Every point $\vec{p}$ on the histology plane satisfies the following equation:

$$\vec{p} = u\vec{u} + v\vec{v} + \vec{h}, \qquad (1)$$

where $u_x$, $u_y$, $u_z$, $v_x$, $v_y$, $v_z$, $h_x$, $h_y$, $h_z$ (i.e., the components of $\vec{u}$, $\vec{v}$, and $\vec{h}$) are the parameters of the plane to be estimated.

We can also not approximate the histology as a single plane, but as a curved manifold or a collection of multiple planes. One will do so by dividing up the histology section into multiple parts, and use lines present in each part to locally approximate a plane. Because we only need 2 horizontal lines and 2 vertical lines to compute a plane, and since we have 3 or more lines of each kind, we can fit multiple planes say one plane for the left hand side of the histology and one plane for the right hand side and perform 3d interpolation between the different parts of the histology section. We saw that there isn't much difference between these planes so it is better to fit just one plane, as the error from that is very small.

We can identify specific points in the histology plane $(u=u_1, v=v_1)$, $(u=u_2, v=v_2)$ etc. that are both on the histology plane (by definition) and on the photobleach lines. We can also identify which of the photobleach lines ($L_1$, $L_2$, etc.) by using the photobleach position ratio as described in more detail below. In this example we assume $(u_1, v_1)$ is on line $L_1$, $(u_2, v_2)$ is on line $L_2$ etc. We can estimate some of the plane parameters by using least squares method or otherwise providing an optimal solution to this system of equations:

$$\begin{pmatrix} L_{1x} \\ L_{2x} \\ L_{3y} \\ L_{4y} \\ \dots \end{pmatrix} = \begin{pmatrix} u_1 & 0 & v_1 & 0 & 1 & 0 \\ u_2 & 0 & v_2 & 0 & 1 & 0 \\ 0 & u_3 & 0 & v_3 & 0 & 1 \\ 0 & u_4 & 0 & v_4 & 0 & 1 \\ \dots & \dots & \dots & \dots & \dots & \dots \end{pmatrix} \begin{pmatrix} u_x \\ u_y \\ v_x \\ v_y \\ h_x \\ h_y \end{pmatrix}. \quad (2)$$

This system of equations is formed by taking x and/or y components of Eq. 1 for each point used for the fitting, and noting that points on the photobleach lines have known x or y coordinates which appear on the left hand side of Eq. 2. Briefly, $L_{1x}$ etc. are known from the pattern on the top surface of the sample, and $u_1$, $v_1$ etc. are read off from point positions in the histology plane. Preferably, enough points are used to make the system of equations overdetermined.

Alternatively, we can formulate the set of equations as follows:

$$\begin{pmatrix} u_1 \\ u_2 \\ u_3 \\ u_4 \\ \dots \end{pmatrix} = \begin{pmatrix} L_{1x} & 0 & -v_1 & 0 & 1 & 0 \\ L_{2x} & 0 & -v_2 & 0 & 1 & 0 \\ 0 & L_{3y} & 0 & -v_3 & 0 & 1 \\ 0 & L_{4y} & 0 & -v_4 & 0 & 1 \\ \dots & \dots & \dots & \dots & \dots & \dots \end{pmatrix} \begin{pmatrix} f_1 \\ f_2 \\ f_3 \\ f_4 \\ f_5 \\ f_6 \end{pmatrix}$$

where $u_x=1/f_1$; $u_y=1/f_2$ $v_x=f_3/f_1$; $v_y=f_4/f_2$ $h_x=f_5/f_1$; $h_y=f_6/f_2$ In this formulation we don't solve directly for $u_x$, $u_y$, $v_x$, $v_y$, $h_x$, $h_y$, but instead solve for $f_1$, $f_2$, $f_3$, $f_4$, $f_5$, $f_6$. However, in this formulation all the measured $u_1$, $u_2$, ... are in a separate column which means that inverting the equation will yield less variance or noise in the estimation of plane parameters. This method however assumes $u_x \gg v_x$, $u_y \gg v_y$ but provides more accurate results. However, if $\vec{v}$ is not very close to parallel to the z direction the second method is less accurate in the sense that there is more variance in the plane parameters estimation, and thus we chose the first method for this example.

This solves the estimation problem for 6 out of the 9 parameters. The remaining 3 are $u_z$, $v_z$ and $h_z$. The parameters $u_z$ and $v_z$ can be estimated by assuming no shearing and uniform shrinkage:

$$\vec{u} \cdot \vec{v} = 0 \text{ and} \quad (3)$$

$$\|\vec{u}\| = \|\vec{v}\|. \quad (4)$$

We could alleviate these constraints by allowing some shrinkage and shearing, which converts Eqs. (3) and (4) to $$\vec{u} \cdot \vec{v} = a \text{ and} \quad (3b)$$

$$\|\vec{u}\| = \|\vec{v}\| + b. \quad (4b)$$

where a and b are free parameters of the problem, estimated for each alignment. However, we found that for most realistic cases their value is very low, so we can assume a=0 and b=0 thus simplifying the equation.

Finally, $h_z$ can be independently determined (e.g., by fitting the tissue surface between histology and the OCT). In order to determine $h_z$ position we used manual registration of tissue surface with the OCT surface. We considered a few options to do so: 1) matching tissue surface seen in OCT and seeing in histology, 2) matching gel surface between two modalities, 3) matching features inside the gel, e.g. natural occurring clumps or adding beads to the gel to provide as landmark to allow us to adjust $h_z$ until match is formed, 4) using the Gaussian shape of the beam as it is photobleached into the gel to estimate what depth was the focal point at the time of bleaching. We choose option #1 for simplicity, it also doesn't require one to find any specific features at the gel and is less sensitive to shearing or morphing of the gel itself.

We also use the marking of tissue interface as a proxy for alignment quality, by measuring the amount of overlap and distance between tissue interface as seen in OCT and histology—we can estimate how far the received alignment is from the actual alignment.

Since we request multiple sections and slides from histology, we make the reasonable assumption that all sections coming back from the same batch (or as we call it, iteration) 1) have the same spacing between them and 2) have the same plane normal. We can use multiple sections from the same iteration to further fine tune the plane parameters. We do so by averaging the normal vector of all the planes to get a stack normal vector, we also average the uniform shrinkage factor $\|u_{section}\|$ to get a stack uniform shrinkage factor $\|u_{stack}\|$.

Finally, we compute the plane distance for each section to OCT origin and fit a linear line. Our assumption is that on average, histology planes are equally spaced along the cutting direction.

After computing average normal, average scale factor $|u|$ and fit a linear distance from origin, we can recompute plane alignment for each slide—this will be considered as the stack aligned planes. One can repeat the same method but extracting outlier planes such as planes that have unusual scale factor (sample usually shrinks by 5% to 15%, so sections that shrink further, or expand are considered suspicious), or do not fit with the linear plane distance fit (say more than 50 um away from the linear fit), or have their normal have large angle compared to the stack normal (more than a few degrees) and recompute for higher accuracy.

Following the stack alignment step, we give the user the ability to fine tune the alignment using a simple graphic user interface. User can change uniform scale factor, rotation angles and position of each slide individually by comparing the OCT image with the corresponding histology and finding features that appear in both such as tissue structure and curvature, hair follicles, cell clusters etc.

Our analysis of over 200 samples have shown that in most cases stack alignment will match the right plane up to cross plane distance of 20 microns, so fine tuning can be done to further adjust plane alignment given that the features used to align are smaller than 20 microns. Fine tuning can also adjust for in-plane error.

We were able to confirm that a plane is a very good approximation for the histology cut (as opposed to a curved surface), and that the no shearing and uniform shrinkage assumptions are indeed reasonable in biological samples at the scales that OCT performs a scan (1 mm with 1 micron pixel size).

We performed optimization and analysis on various aspects of the photobleached marker, including the depth of the photobleach lines, the duration and number of repetitions of the photobleaching, the length of the photobleached lines, the number of photobleached lines, and the spacing/pattern of the photobleached lines.

The ideal depth of the photobleached lines depends on the following tradeoff: Lines deeper in the gel (up to ~100 microns above the tissue) benefit in terms of alignment quality by being closer to the tissue sample, but suffer from greater optical distortion as the optical path is warped by inhomogeneities in the gel. The lines closer to the surface of the gel suffer from less optical distortion, but are also farther from the tissue and are more easily distorted by shearing during the processing of the tissue (shearing measured by shearing tensor norm, or shearing tensor norm divided by the isotropic expansion tensor norm, or by the largest vector norm in the shearing tensor) we found shearing tensor norm to be up to 10% to 15% in most samples. Additionally, we performed simulations of the photobleached lines in a homogeneous gel model, with a noise profile matching that found when imaging the fluorescent gel. The results indicated that we needed to see photobleached lines of at least 100 um in length in order to suppress the theoretical tilt angle error below 1.5 degrees. Ultimately, we decided on the latter option of photobleaching close to the surface of the gel (according to protocol—100 um below the gel interface) as this gave better empirical results measured over a large dataset.

The optimal photobleaching duration for each line depends on the desired line thickness, contrast, and given laser power. A photobleaching time that is too short (fraction of a second) will result in reference features that are too indistinct to observe in the 2D image. A photobleaching time that is too long (a few minutes) will lead to reference features in the 2D image that are thicker than necessary (more than 1.5 times the width of the optical beam of the photo bleach laser), thereby undesirably reducing resolution We settled down on 15 seconds of exposure per 1 mm of line, but 5 seconds work as well, if using higher NA lens total exposure should go down as we photobleach a smaller area.

We elected to use the highest power supported for our laser module, in order to minimize photobleaching duration. To determine the optimal number of photobleaching repetitions for each line, we performed several photobleaching tests where the laser moved across a fluorescent gel at different rates (two repetitions per cycle up to 50 repetition) while keeping the total duration of photobleaching constant. We found that the contrast of the photobleaching was strongest when photobleaching at the slowest speed achievable by the galvanometers. Hence we perform two repetitions across each line, sweeping in the forward and backward directions.

It is advantageous to increase the length of the lines (at the top view) if possible because this allows sections that are cut very far from the origin (OCT center) to be aligned as we can see the photobleach lines in the sample, as not all sections are cut such that they are positioned to capture all 8 lines. For each of the group of 4 lines (8 total), we let 3 out of the 4 lines extend 8 mm across, as we need 3 lines at minimum to determine the identity of each line and align the section. These 3 lines are used for the first iteration procedure, to determine the precise location of the optimal region. As described below, sections of the first iteration may be a few millimeters away from OCT center, thus we use the 3 (3 lines of each kind, 6 total) long lines to align them, using 3 lines provides less accurate alignment (we saw cross plane error go up by a factor of 1.5 an higher) but is enough to generate instructions for the second iteration. The last line in the group of 4 is 2 mm long. This line is shorter in order to save time on photobleaching. Thus within the optimal region, we have 4 lines total in each group.

For the same reason there is a benefit to adding more lines if possible. We found that 8 lines provide the most accurate alignment results. The lines are positioned such that it maximizes the physical area in which one is likely to cut a section with more than 3 lines visible.

Figure 2C:
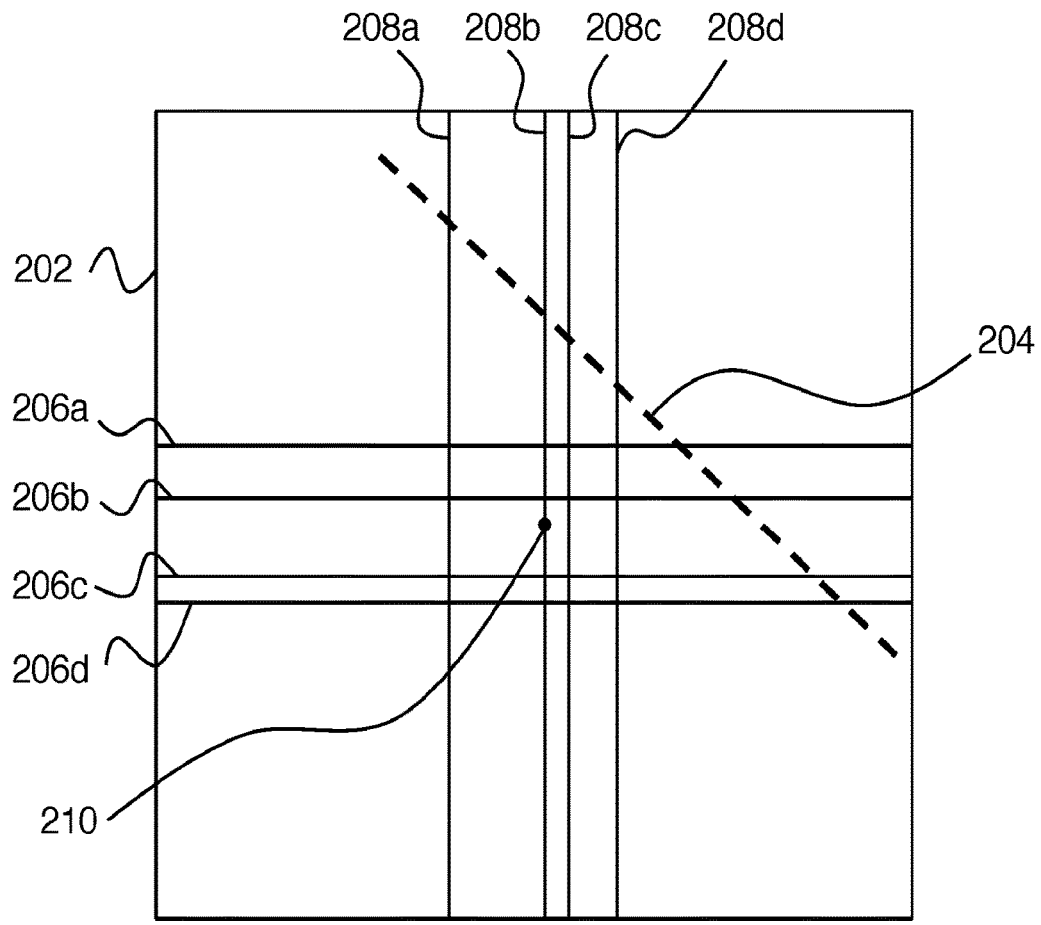
FIG. 2C is a top view of another exemplary predetermined pattern.

Photobleach pattern: FIG. 2C shows a top view of an exemplary 8-line pattern (4 of each kind). This is the kind of pattern that was used in our experimental work. Here 202 is the OCT field of view, 210 is the origin (i.e., OCT scan center), 204 is the histology cut, 206a, 206b, 206c, 206d are horizontal pattern lines as described below and 208a, 208b, 208c, 208d are vertical pattern lines as described below. As indicated above, line spacings are preferably chosen such that the identity of each line is encoded by the spacing of that line to the surrounding lines (the distance ratio between the surrounding lines is unique). In our current implementation we use 4 horizontal and 4 vertical lines. Horizontal lines are positioned at $-3*b$, $-2*b$, $1*b$, $3*b$ and vertical ones are in positions $-4*b$, $0$, $1*b$, $3*b$. Here the origin (0,0) is the OCT scan center, and b is the base unit of measure and depends on the field of view being encoded (we choose 100 microns but 50 microns up to 200 microns will also work). Note that the resulting distance ratios are preserved independently of the angle the histology cut makes with respect to the lines. Uniform shrinkage of the sample during histology preparation also has no effect on these distance ratios.

The preceding is an example where the predetermined pattern is formed by writing a top surface of the 3D sample with a pattern of intersecting lines, whereby the predetermined pattern is a corresponding pattern of intersecting planes. The pattern of intersecting lines preferably includes a first set of lines perpendicular to a second set of lines. The first set of lines preferably has a first spacing pattern between the lines that permits identification of a line from its distance ratios to adjacent lines in the 2D image (as in the example of FIG. 2C). The second set of lines preferably has a second spacing pattern between the lines that permits identification of a line from its distance ratios to adjacent lines in the 2D image (as in the example of FIG. 2C). E.g., in the example of FIG. 2C, a line in the histology image having a distance ratio of 1:2 with respect to its neighbors can be identified as coming from line 208c of the pattern of FIG. 2C. A line in the histology image having a distance ratio of 2:3 with respect to its neighbors can be identified as coming from line 206b of the pattern of FIG. 2C. Edge lines of the patterns (i.e., 206a, 206d, 208a, 208d) can be identified based on their positions relative to lines that can be identified via distance ratios (i.e., 206b, 206c, 208b, 208c).

u, v, h parameters: The 2D section (e.g., histology plane) is preferably cut substantially perpendicular to the top surface of the 3D sample, and such that a plane of the 2D slice intersects the first set of lines and intersects the second set of lines (e.g., as on FIGS. 2A and 2C). Here "substantially perpendicular" means the 2D section intersects the top surface of the 3D sample with an angle in a range between 75 degrees and 105 degrees, but we were also able to align sections with angle up to 50 degrees. Two planes P1 and P2 intersect in a line L, and their intersection angle is defined in a third plane P3 perpendicular to L by the angle between the lines formed by projections of P1 and P2 into P3, as is well known from geometry.

As described in the example above, the 2D section can be parametrized by a vector origin ($\vec{h}$) and two vector directions ($\vec{u}$ and $\vec{v}$). Let the z direction be perpendicular to the top surface of the sample. Then x and y components of $\vec{u}$, $\vec{v}$, and $\vec{h}$ can be determined by least squares fitting, z components of $\vec{u}$ and $\vec{v}$ can be determined by assuming uniform shrinkage and no shear, and the z component of $\vec{h}$ can be determined from an independent measurement.

The preceding examples are of patterns that have two sets of perpendicular intersecting lines, as shown again, schematically, on FIG. 2D. Here 220 is the pattern on the top surface of the sample, 222 is the OCT volume range and 204 is the histology cut. Other patterns can also be used. In the example of FIG. 2E, pattern 230 has angled line segments as shown, with the overall pattern being roughly 'M' shaped. In the example of FIG. 2F a binary 2D pattern 240 is shown. FIG. 2G is a simulation of bleaching that might be expected from the pattern of FIG. 2F. For FIGS. 2F-G the pixel edges are roughly 10 microns long.

The configuration of FIG. 2D has the advantage of a relatively simple mathematical formulation as described above, but requires the histology cut 204 to be at an angle with respect to the OCT volume 222. The mathematics for the pattern of FIG. 2E are a bit more complicated because x and y components will be mixed (as opposed to being independent as in the above examples). The configuration of FIGS. 2F-G, which can be regarded as an example of a 2D bar code or position encoding within the sample, provides the most accurate alignment in principle, but is the most demanding in terms of calibration of the optics to produce the pattern as known locations in the sample. The configuration of FIGS. 2F-G also has a larger fraction of the sample bleached than patterns of lines, thereby requiring more photobleaching time and/or higher optical intensity.

Figure 3A:
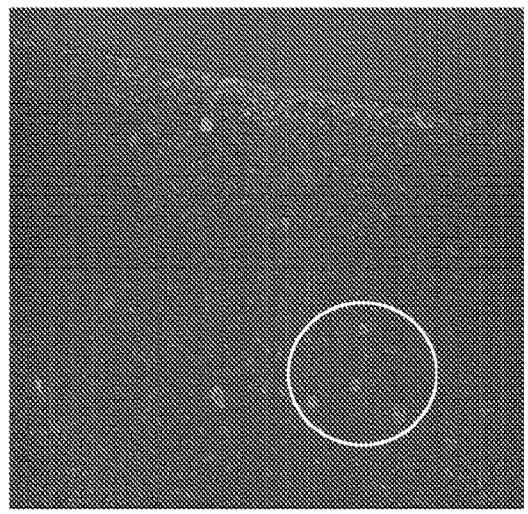
FIGS. 3A-B show an example of the use of particles to quantify and/or improve alignment of a 2D image to a 3D image.
Figure 3B:
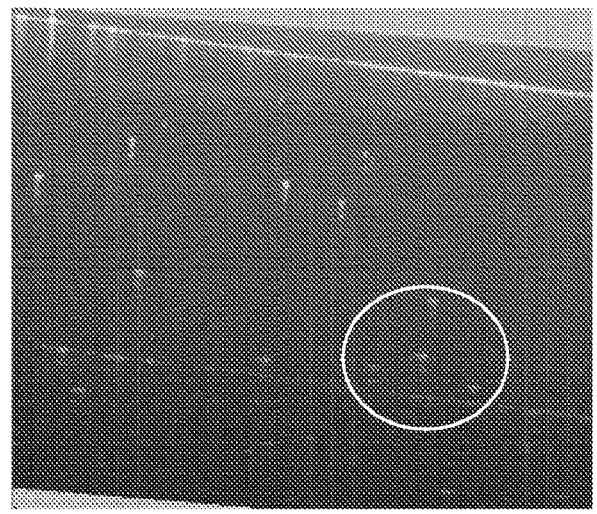

FIGS. 3A-B show an example of the use of particles to quantify and/or improve alignment of a 2D image to a 3D image. More specifically, particles can be added to the 3D sample where the particles are visible in both the first and second imaging modalities. Particle features in the 2D and 3D images can be used to improve and/or quantify alignment accuracy between the 2D image and the 3D image. It is worth mentioning that particles by themselves do not suffice to find accurate alignment as they in most cases don't have a unique encoding of sample position due to slight deformation or movement (of a few tens of microns) of the particles in the histology process makes it such the exact pattern of particles in histology is not seen anywhere in OCT. Here FIG. 3A is a fluorescence image of a histological slide of an agarose-gelatin gel with 25 um particles, and FIG. 3B is the OCT slide that the alignment algorithm predicts to be corresponding to the histology slide. The same particles are visible in both images (enclosed with white circles). When overlaid, the particles in both images align almost perfectly, indicating alignment accuracy within at least 25 um.

Fluorescent particles, with different fluorescence color then the sample sensitization can be added to the sample. Due to their reflectance and fluorescence properties, they can be detected in both the OCT system and the fluorescent microscope, and can serve as a mutual feature in both imaging modalities. After the alignment algorithm estimated the plane and pulled the corresponding slice from the OCT volume, the particles can be used in order to:

1) Fine tune the estimated plane by maximizing the number of paired particles that can be seen in both images (fluorescent and OCT) and/or
2) Quantify the alignment performance, by estimating the transformation between the algorithm estimated plane and the fine-tuned plane.

Both uses are particle size dependent. Smaller particle size will result in better fine tuning and better alignment performance quantification. However particles under 1 micron are not easily visible in OCT. There are several metrics that can be used to determine how good our alignment is. Let us assume our best fit for the histology plane is H1, and the 'real' plane is H0, we can use the following metrics to determine how 'far' H1 is from H0.

1) cross plane alignment (we use this one most commonly): by determining how much H1 needs to move along the normal to H1 to match the average position of H0. We use this method as it describes an error which is not trivially visible when comparing OCT and histology images
2) Angular error—computing the angle between H1 normal and H0 normal. This angle is usually very small and so we rarely use it
3) Average point translation. We can map each point in H1 to a point in H0 and ask what is the average, median or max distance between these points.

An important application of this work is to provide synthesized histology images. Such a method can include performing 2D to 3D alignment, as described above, multiple times on different tissue samples to provide a training data set. Here the second imaging modality includes histology. The resulting training data set relates the first imaging modality to corresponding histology. Next, a machine learning system is trained using the training data set. As a result, the machine learning system can provide synthesized histology images using the first image modality.

Figure 4:
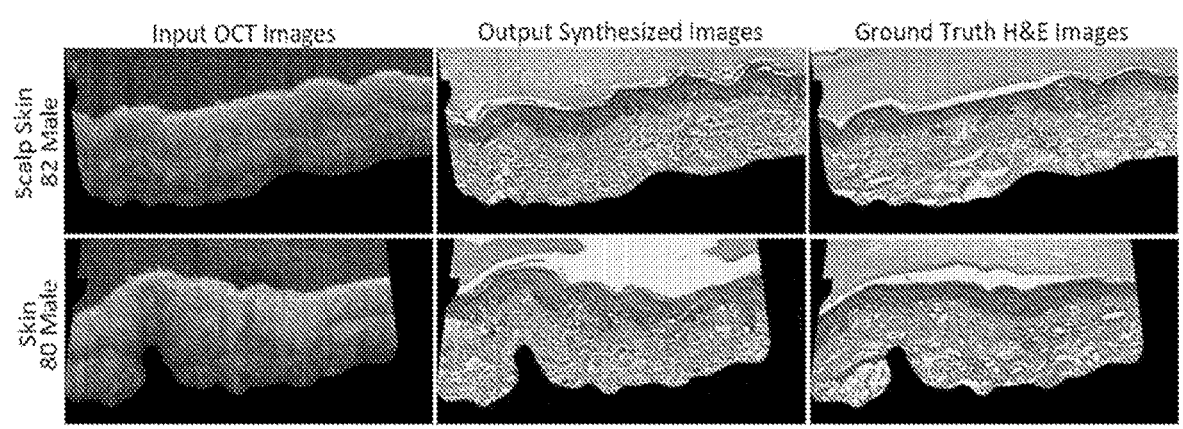
FIG. 4 show exemplary results from a machine learning system configured to provide synthesized histology images from 3D optical coherence tomography imaging.

FIG. 4 shows exemplary results from a machine learning (ML) system configured to provide synthesized histology images from 3D optical coherence tomography imaging. Here the left images are OCT images, the center images are synthesized histology images provided as described above, and the right images are the corresponding histology ground truth. The subjects that these images were computed for were not part of the training set the algorithm was exposed to.

Figure 5:
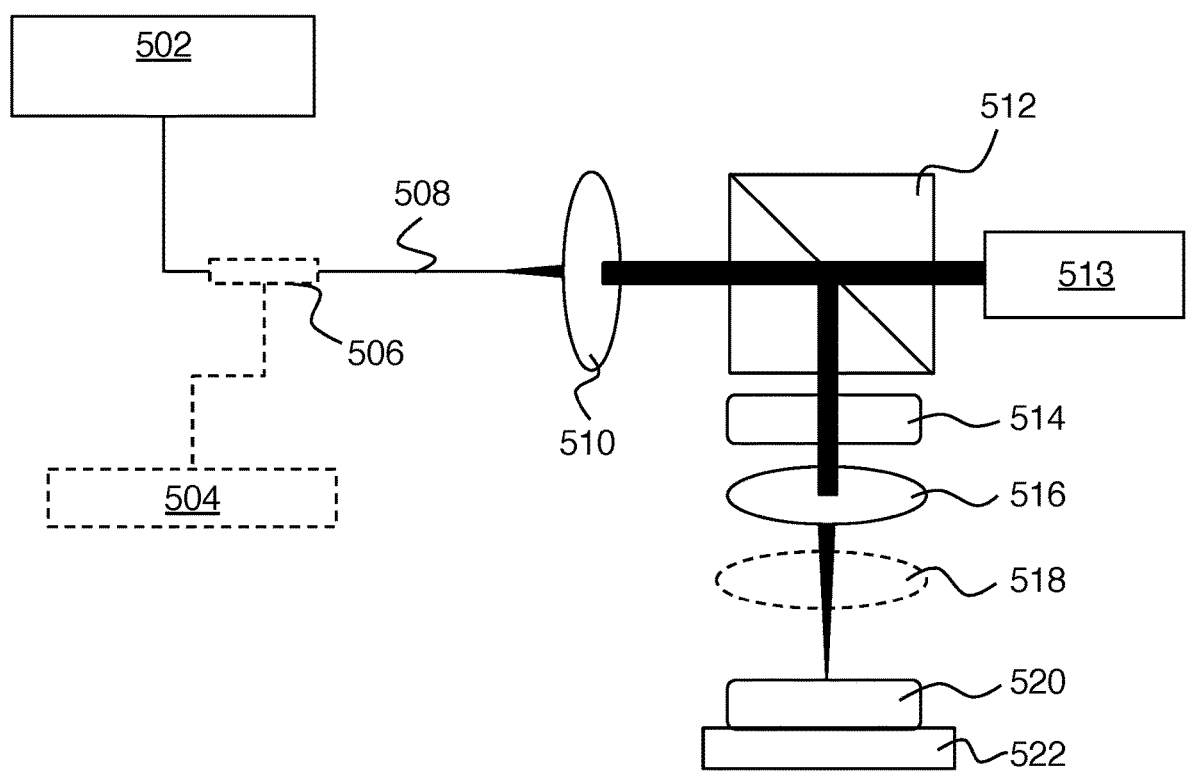
FIG. 5 schematically shows an exemplary optical system for use in conjunction with embodiments of the invention.

FIG. 5 shows an exemplary OCT system for use in connection with embodiments of the invention. Here 502 is a light source and spectrometer, 504 is an optional second light source and 506 is an optional fiber coupler for combining the outputs of sources 502 and 504. Fiber 508 carries light from source 502 to the rest of the system. Collimator 510 collimates light emitted from fiber 108. For simplicity, the reference arm needed for an OCT system is shown schematically as block 513. Beam splitter 512 splits light from collimator 510 so that some light goes to reference path 513 and some light goes to sample 520. Sample 520 is mounted on translation stage 522. Between beam splitter 512 and sample 520 is an optical train including a galvanometer 514 (for scanning the beam), an objective 516 and (optionally) a removable spectral filter 518. In operation, light from sample 520 and light from reference arm 513 is combined by beam splitter 512 to interfere in a detector included in source 502. Galvanometer 514 provides 2D beam scanning, and it can be a combination of two orthogonal 1D scanners, or a single device that provides 2D scanning.

It is important to do the photobleaching of the dye at a different wavelength than the wavelength used for imaging. If the two wavelengths are the same, the OCT imaging undesirably interferes with the alignment pattern. However, it is convenient, and significantly more accurate, to use the OCT system to write the alignment pattern, as opposed to using a separate optical system to write the pattern. Thus it is preferred for the OCT system to be provided with a dual wavelength capability. There are two ways to do this.

The first approach is based on the use of spectral filter 518 in the beam path between source 502 and sample 520. If the OCT source is a super luminescent diode or a swept source, then we can utilize the system as following: we apply a low pass, high pass or notch filter 518 (depending on the light source wavelength relative to the dye absorption band(s)). The function of the filter is to ensure the light used for the OCT scan does not bleach the dye. Although FIG. 5 shows filter 518 disposed between objective 516 and sample 520, filter 518 can be disposed anywhere between source 502 and sample 520. For example, after objective 516, just before objective 516, before 2-D galvanometer 514, or before, after or within fiber 508. This 2D galvanometer can be provided by two 1-D galvanometers (our approach in this example) or with a single device providing both scanning directions. We chose to locate filter 518 after objective 516 because it requires minimal modification of an off the shelf OCT system. While we scan, the dye is not bleached by the laser because the wavelengths that the dye is sensitive to are shielded by the filter. After the scan we remove the filter, increase the OCT laser power and use the same system to photobleach. The second time around the part of the OCT spectrum that the dye is sensitive to reacts and photobleaches the dye.

The second approach is applicable in cases where the OCT system utilizes light that the dye is not sensitive to. Here we need to couple another light source (i.e., optional second light source 504) and turn it on when we want to photobleach (here removable filter 518 is not used). Here optional coupler 506 is used as wavelength combiner in the forward direction (left to right) and as a wavelength splitter in the reverse direction (right to left). This ensures that high optical intensity as needed for photobleaching does not enter the OCT detector system within block 502 (which could be damaging to the detector). It also ensures that the OCT signal light is routed to block 502 for detection.

The first approach is better if there is an overlap in wavelengths between dye absorption bands and OCT emission wavelengths, and the second approach is better if there is no such overlap. The second approach has better vertical resolution than the first approach because we don't block any of the OCT light. Both methods guarantee that photobleaching is done in the same coordinate system as OCT scanning and both methods are better than using a completely separate way to photobleach. Practical systems will include the second light source 504 or the removable filter 518, but do not need to have both.

Another practical issue is the translation stage. Because we use a high NA optical system we can't have the entire sample in focus at the same time. In principle there are two ways to deal with this: either by moving the sample, or by moving the OCT scanning head, another alternative is to design an optic element that will shape the beam as a needle such that the entire sample is in focus (for example Bessel beam), or that have multiple focus positions in the sample. We choose moving the sample. This way turns out to be easier for correcting for path length aberrations in the index of refraction mismatch between the tissue and the medium around it thus increasing system stability and resolution. Here the measure for stability is displacement in x, y, z as a result of the act of imaging.

Thus translation stage 522 is preferably a 3D translation stage that can travel in three orthogonal directions. It can travel vertically to bring the sample into focus, but can also travel in two transverse directions to bring different parts of the tissue into the field of view of objective 516.

Figure 6:
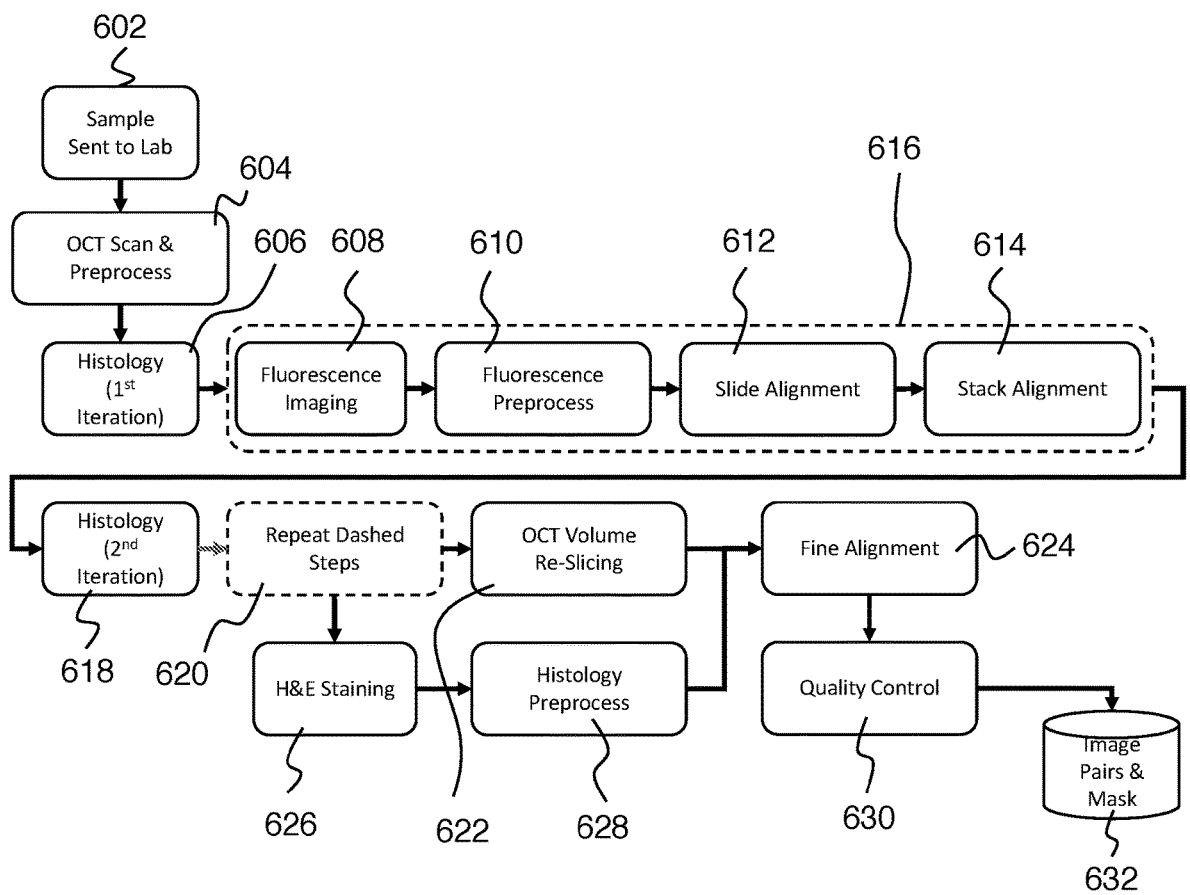
FIG. 6 is an exemplary flow chart for providing paired OCT and histology data according to an embodiment of the invention.

FIG. 6 is an exemplary flow chart for providing paired OCT and histology data according to an embodiment of the invention. The main issue addressed by this example is that it is difficult to get the histology cut to be placed as desired with sufficient accuracy to provide training data as described above for machine learning to provide synthetic histology. This difficulty is addressed by a first iteration of the alignment method that provides information on the location of a first histology plane in the OCT image. This provides a reference such that the second histology series of cuts can be specified relative to the first histology iteration to ensure the second histology iteration goes through a useful part of the sample for training data. Thus the instructions for the second histology iteration can be something like "cut to specified depth, relative to the first iteration".

More specifically, step 602 is sending the sample to the lab. Step 604 is OCT scanning and preprocessing (e.g., sensitizing the sample by encasing it in a dye-doped gel). Step 606 is the first histology iteration, which includes step 608 of fluorescence imaging, step 610 of fluorescence preprocessing, step 612 of slide alignment and step 614 of stack alignment. Steps 608, 610, 612, 614 taken together are sub-method 616.

Step 618 is the second histology iteration, which includes sub-method 620 having the same steps as sub-method 616. After this, we have OCT volume re-slicing 622 which is related to a histology image provided by H&E staining 626 followed by histology preprocessing 628 by alignment as described above. Optional steps of fine alignment 624 and quality control 630 can be performed prior to archiving the OCT-histology paired data in data storage 632. Here the masks of data storage 632 are image masks applied to OCT and/or histology images are part of quality control 630.

Fine alignment: After the stack alignment is done the user is given the option to manually fine tune the alignment by moving along the OCT volume perpendicular to the aligned plane, and within plane. In this step user will try to fine the same features in histology and OCT and match tissue structure as well as structures inside the tissue and the gel.

There are additional methods to perform fine alignment for example brute force through many planes, maximizing the correlation between OCT and histology images, or align rotation in u-v plane then go through different positions perpendicular to the plane, feature matching between features on the tissue in OCT and histology, using beads or clumps in the gel to try and match as many. We found that manually fine-aligning the images, by adjusting the translation, rotation, and section y-position, yields the most accurate alignment results, in terms of both cross plane and in plane errors. We found that most samples have cross plane error of 20-25 um from the stack alignment to the fine alignment, giving a bound on the amount of cross plane error.

ML preprocessing: We apply a few additional processing steps to the paired images before the machine learning training. The first is digitally extracting a 5 um to 20 um averaged slice of the OCT image for each section to match the physical 5 um H&E slices and cross plane uncertainty in the alignment. We only consider images within about +−550 um of the center of the OCT scan as they have significant overlap between OCT and histology, in order to ensure each image is sufficiently large. We then perform several steps of masking on the OCT image. We crop the image to 100 um above the interface of the tissue in the OCT image, and 500 um below due to low SNR of OCT image which interferes with the learning process. One can choose other bounds depending on the details of the OCT system being used: depth of penetration namely. Additional masking is performed to crop out signal poor regions of both images, as these regions do not contain useful training data. We also resample both images to have the same scale of 1 microns, but other resolutions are acceptable. In choosing the resolution one should consider OCT imaging resolution and beam size, histology imaging resolution as well as the size of the features they are trying to reconstruct in the synthetic image. We find all OCT images can be vertically fit within a frame of 672 pixels, and horizontally fit within a frame of 2048 pixels. Hence, for each image we take two 1024×672 crops aligned to either horizontal end of the original image. The image size of 1024×672 is chosen as it allows us to train models that fit within about 10 GB of GPU memory.

We perform a final stain normalization step on the H&E images. The individual H&E images exhibit a wide range of color spaces, even though each image technically contains only two stain colors for haematoxylin and eosin. There are a variety of experimental reasons why the staining colors can vary from sample to sample including stain concentration, staining method, and time. The end result is that some images have much more contrast, or deeper colors compared to others. This can confuse the machine learning algorithm.

We seek to overcome this problem with stain normalization. We use a SVD decomposition of the pixels in each H&E image to find the 2 vectors capturing the largest amount of variance, which should correspond to the colors of haematoxylin and eosin. With these vectors, we can extract the concentrations of haematoxylin and eosin at each pixel, and recalibrate the image with a new pair of H&E vectors.

Figure 7:
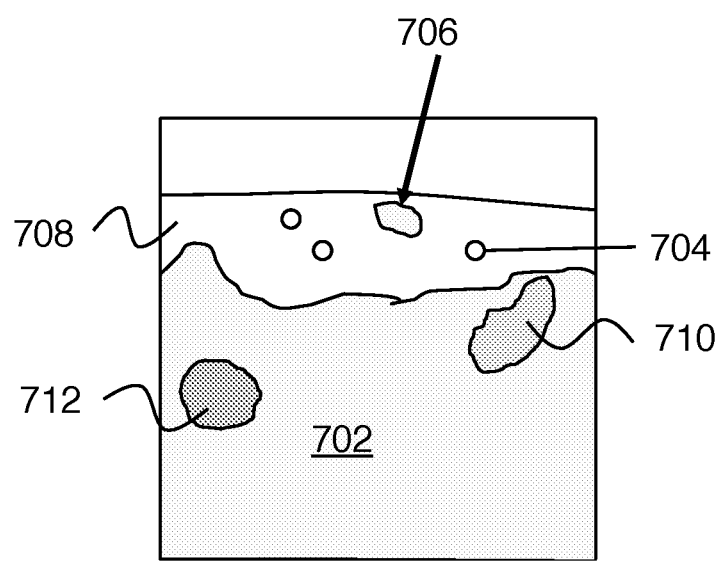
FIG. 7. is a schematic cross sectional view of a typical sample.

FIG. 7. is a schematic cross section view of a typical sample. Here 702 is the tissue sample, 708 is the gel, 704 is a particle in the gel, 706 is a gel clump, and 710 and 712 are tissue features (e.g., cell clumps, hair follicles etc.) Such tissue features may be used to validate alignment. Similarly, particles and features in the gel (e.g., 704, 706) may be used to enhance or adjust or validate the alignment. Preferably the gel thickness is 200 um to 600 um. Thinner than that and the gel might break during histology processing. Thicker than that and the gel may excessively distort light beams, thereby undesirably blurring the photobleached lines of the alignment pattern. The tissue—gel interface may also be used for alignment.

B) Further Details

B1) Quality Control for Machine Learning Data

We implement numerous steps of quality control to ensure that our training dataset of paired OCT and Histology images is of high quality. Much of this quality assurance data is collected through a digital survey, from the user performing the fine alignment. The first check is of whether or not both the OCT and Histology images are of high quality. For the OCT image, this means there is no significant shadowing effect, or a lack of contrast in the tissue, and the epithelium is distinguishable. For the histology image, this means there is not significant tearing, damage to the tissue, or staining artifacts. We then rate the alignment quality between the H&E and OCT images, the following scale: "3—Perfect Alignment", "2—Good, With Flaws", "1—Bad", and a 0.5 point increment. We only use images with a score of "2" or higher for constructing the machine learning database. We also gather additional statistics on the error of the y-axis (cross plane translation) fine-alignment by asking the user to rate how far (in um's), he or she can shift the OCT image before it becomes obvious that alignment is wrong by looking at matching of features between the two images. This allows us to gather statistics on how robust and useful the fine-alignment process is.

B2) Making Sure the Histology Sections Intersect OCT Volume

It is a problem to specify for the histologist where exactly to make a cut such that they will hit the center of the fluorescent marker, and hence the center of the OCT scan where we have the most overlapping data. We found that the most useful area is +−550 microns from the center of the OCT, though as you get closer to the center the more useful data you have. To do so, we take an overview OCT image and we use the overview image as a guide to tell the pathologist how deep to cut into the tissue once they see a full face. An overview image translated the sample along x-y direction and taking low resolution images, unlike the main OCT imaging stage, we don't require many z depth and resolution of each image is significantly lower (10 to 20 um per pixel). This process is however full of uncertainties: when does a pathologist recognize a full face, the angle of the cut and how much the tissue deforms or shrinks as result of the histology processing (fixation and cutting). For this reason, we give an initial estimate to the pathologist how deep to cut (we aim to provide the first cut 250 um before the OCT center) and we use this first cut to calibrate what is the implied coordinate system used by the pathologist. This step is not mandatory, but it improves the sample yield as after doing it once per sample, we are able to target exactly where to do the 2nd batch cut, or as we call it, the 2nd iteration. We aim the 2nd iteration to be at the center of the OCT image for maximum amount of data. Our experience has shown that by doing that, we are able to get within up to 40 microns from the center.

We don't have to provide these target distances for the first and 2nd iterations. Instead we can do the first iteration up to the size of the marker (a few millimeters) away from the OCT center but aiming too far we risk of missing the photobleached lines and then we can't calibrate the pathologist's coordinate system against the OCT coordinate system. Aiming too close to OCT center, and if the pathologist makes a small mistake and we will not be able to extract most of the information from the slide as it will not be where we have the OCT data. We have seen variation of 0.6 mm in depths of the first iteration.

As a side note, we had to calibrate for histologist cutting machine. The histologist has a machine in which he/she inputs the size of the section they would like to cut, and theoretically the machine cuts slides of that thickness. However, the uncertainty and calibration of that machine can be off by 100%, so by requesting pathologist to cut 100 um into the tissue, we will sometimes discover they cut 200 um.

To overcome this issue, we had to calibrate pathologist machine by asking them to cut 15 sections (number can vary between 10 and 45) of tissue embedded in gel with the photobleached lines. We aligned all the slides using this method including stack alignment described above and measured what is the average plane distance difference between consecutive slides. This distance is presumed to be the pathologist machine's thickness. We repeated this experiment multiple times with different machine thickness settings. This way we could calibrate the machine to about 10% accuracy. This calibration seems to be constant over time and therefore is only required every few months or so.

It is recommended to wait between 0 to 7 days between the first and 2nd iteration. That time allows experimenters to fluorescent scan the tissue, align and prepare further instructions for the histologist how to continue cutting the tissue. The longer you wait, the more risk you have of losing the fluorescent signal as dye will be photobleached by being exposed to ambient light. Moreover, as time passes, the sample block dries a bit causing fractures in the gel and tissue. For that reason, pathologists are required to shave off about 200 um from the last position they cut until they can start providing sections for us to use. Sections that were closer than 200 um to the last cut showed significant damage. The longer you wait, the more this drying process will occur and the deeper the histologist will need to cut before providing additional samples.

We need to account for those 200 um when designing what depth to cut the first iteration. We want to make sure that the first iteration position not only accounts for the uncertainty in histologist's ability to get the section we need, but also we would like to keep 200 um buffer such that the 2nd iteration will be able to cut through the buffer and still be in the right spot to accrue data B3) Further Consideration of Line Spacing in Alignment Patterns The position of the alignment markers should be set in a way that the difference in distance between consecutive lines d1, d2, d3, . . . will be unique. Where d1 is the difference between line 1 position and line 2 positions, etc. For simplicity, we can assume d1, d2, . . . are integer numbers and there is some base unit b (in microns) that multiplies d1, d2, . . . to get the exact separation. In order to select b we need to balance between smallest separation between two lines—we don't want it to be comparable with the photobleach laser spot size for example, because then we can't tell lines from one another. We also don't want b to be too big because the lines will be far apart and outside the field of view of the laser, so we cannot photobleach all of them. For our setup we choose b=100 microns, but values from 50 to 200 also work well.

There are a few ways to select d1, d2, . . . for example by setting each of them to be a different prime number, by doing so, we can uniquely know which line we are looking at by comparing the distance to its neighbors. Using a different prime number for each distance is not efficient in the sense that prime numbers grow relatively quickly which means difference between consecutive lines will become larger and larger until lines are out of the field of view.

A more efficient way to encode, is to allow for the same integers to repeat but to prevent the same division of number to repeat di/d(i+1) only once. This problem can be written as a graph problem in computer science by creating a graph where every vertex (1, 2, 3, . . . , V) represents a difference di and two vertices are connected if their greatest common denominator is 1. For example there will be an arc between vertex 2 and vertex 5 but not between 2 and 4. We then need to find a connected path that has n steps (n+2 being the number of lines required, n+1 is the number of differences, hence n is the number of arcs in the graph). This turns into an optimization problem: find an n step path with the penalty being the sum of all the vertex passed, every edge of the graph can be gone through once.

Minimizing this penalty will yield the following differences. Each has a unique encoding of di/d(i+1).
- 3 lines: H lines: 1-2. V lines: 1-4.
- 4 lines: H lines: 2-1-4. V lines: 2-3-1
- 4 lines second example: H Lines: 1-2-3, V Lines: 4-3-1. The 4-lines second example is slightly better as more of the sample is covered by lines.
- 5 lines: H lines: 1-2-5-1, V lines 1-3-4-1

B4) OCT Calibration

OCT images look like they are curved upwards due to optical path aberrations introduced by the lens, and the fact that galvanometers are not positioned exactly in the back focal plane of the lens but have an error of a few millimeters in positioning, we wanted to correct for that by performing this experiment: when imaging a flat surface, it appears as curved due to optical path. We calibrate by using a flat surface and calibrating once per OCT lens. We do it separately for x direction and y direction and assume we can combine the two by fitting a 2D parabola $a00+a01x+a10y+a02x^2+a20y^2+a11*x*y$. We tried to calibrate x plane and y plane individually as well, by placing the flat surface target at different depths but came to the conclusion that one depth is sufficient. In another words, since OCT provides a depth image, we can place the imaged flat surface in multiple depths, we don't have to image the surface at the focus, we can go up to 1 mm above or below. Our calculations have shown that the exact position in z should not be significant for determining aij coefficients above. We verified that in experiment and tried calibration for different depths. The result of the 2D parabola calibration is that we need to move some pixels up and down the image by as much as a few tens of microns which is significant, as it is comparable with our alignment accuracy.

B5) Cloud and Software Infrastructure

The methods of this work require a significant amount of software and storage infrastructure in order to scale up, which is necessary for any deep learning model to perform well. We've developed a large amount of this software infrastructure with an in-house code package that is designed for easy deployment at different sites. The code has automation for every step of the OCT to Histology alignment process, beginning with code to automatically photobleach, collect an OCT volume, and perform an overview scan.

The data is uploaded onto an Amazon S3 storage server overnight. We could send the files directly to S3 however because each OCT scan constructs thousands of individual files totaling 200 GB which take an extremely long time to upload (a few days). For this reason, we first compress all files together to create one 200 GB file using a tar program but any file concatenation will work (we don't use file compression here, only concatenating all the files together). We then boot up an amazon EC2 machine and upload the compressed file to it. This is done quickly because EC2 is optimized to send large files. We then de-compress the file at the EC2 machine and then copy the files from EC2 to S3 one at a time. Since EC2 and S3 are in the same physical data center, small file transfer between them is very fast. Start to finish we achieve an average data rate of 40 MB per second.

This process can be modified to include multiple EC2 machines where each is sent a smaller file, and therefore are working to de-compress the files in parallel. We can also compress the file in our local scanner machine in parallel, using multiple processes. The primary numbers for optimization here are the time it takes to move the data as expressed by MB per second and cost of local machine and EC2 infrastructure.

In the next step of our pipeline, the user uses the overview scan to precisely determine the correct position in the sample to take dense sections. The sections are then fluorescently scanned and the software guides the user to upload the sections to cloud storage. The fluorescently scanned section is H&E stained and the software again guides the user to upload the H&E section and then aligns it with the previously uploaded fluorescent scan. The user then marks the photobleached lines within software, which is then used to automatically compute the aligned stack of OCT images coarsely aligned with the H&E sections. The user uses the software to perform fine-alignment of each section with each H&E image. At this point, the user runs the quality control script, which masks away undesirable parts of both images, and the software automatically creates the training dataset. This entire workflow is designed to minimize the risk of accidental mistakes and collect data on the efficiency of the entire pipeline.

B6) Further Machine Learning Details

The alignment algorithm described above allows us to create datasets of paired OCT and H&E histology images. A deep neural network can be trained on a dataset that learns the transformation from OCT to H&E image. When deployed with OCT imaging in the clinic, this allows one to skip the entire process of collecting, processing, and imaging the H&E image. This amounts to substantial savings in personnel (for biopsy, processing, staining, slicing) and in time (from hours to days) for the histological processing to take place.

The machine learning model utilized is a Generative Adversarial Network (GAN), which takes as input, an OCT image, and outputs a H&E stained histology image. The GAN model includes two independent neural networks, a Generator Network which generates the image and one or more Discriminator networks which judge the quality of the generated images and provide feedback to help the Generator Network train.

In our application, we focused on human skin samples obtained during Mohs surgery at a dermatological clinic. The objectives of the image generation are to: 1) identify the epithelial layer of the skin tissue 2) generate epithelial features, such as shape and thickness, 3) locate and generate features beneath the epithelium, such as clusters of cells. These features could indicate cancer or some other pathology. 4) Create believable synthetic H&E images that a physician would feel comfortable using. Trained on about 200 unique OCT-histology image pairs taking from 19 subjects ages 70+−15 years from different Fitzpatrick Skin Types (1 to 5), most came from men (about 75%) and from different regions of the human body. Most of our tissue sections came from Scalp (75), Nose (51) Neck (32) Jaw (30) but a few came from Thigh, Arms Shin etc. It is important to diversify section collection against body parts, ages, skin type and gender to generate a reliable data set. On average, each section had an area of 0.39 mm squared of usable data, our generative neural network creates nearly photorealistic synthesized H&E images that closely resemble the ground truth H&E images (FIG. 4)

We experimented with various different model architectures and training regimes to find the best model to suit the above criteria. The primary architectures tested were pix2pix, cycleGAN (with both paired and unpaired sets of images), StyleGAN and pix2pixHD.

A key issue when choosing an architecture is if the architecture matches between paired images, i.e. it has the ground truth of both modalities as a reference or not. Algorithms with unpaired images (CycleGAN, StyleGAN) have been shown to generate image artifacts and incorrect features, which may lead to wrong diagnosis if used for medical imaging purposes, because these methods match the marginal image distribution function rather than the joint distribution. From this standpoint, it is important to use paired images, as in pix2pix or pix2pixHD.

The pix2pixHD model demonstrated by far the best results, while the other models suffered significantly from blurred images, repetitive textures, and a lack of overall image coherency. Compared to the other models, the pix2pixHD model uses multiple Discriminator networks and a chain of residual network blocks in the latent space of the Generator network.

We further optimized the pix2pixHD network to achieve optimal results, by 1) replacing the least-squares loss function with a binary-cross-entropy loss function, 2) disabling Discriminator feature matching, 3) extending the number of residual blocks from 9 to 12, and 4) injecting normal gaussian noise before every normalization layer in the Generator Network.

A challenge with the current model is that mistakes can be made when encountering images with features significantly different from those well-represented in the training dataset. This is an area we expect to see improvement in as we enlarge the dataset, and as with other deep learning models, the quality of the generated results should scale immensely with the amount of training data.

B7) Calibration of OCT Units

Another important aspect of this example is the calibration of the OCT system, that includes: calibration between physical units and the OCT system units, angle offset (testing if the laser scans in straight lines), B-scan jittering (testing if the laser return to the same physical location for multiple B-scans) and fast to slow axis. Calibration between the fast and slow axis means between the direction the laser scans (moves fast) a single B-scan to the direction which it is shifted and the end of each B-scan (moves slow) to generate a volume. The fast axis is referred as x axis, slow as y in most OCT conventional systems. The calibration was done by imaging a silicon wafer with engraved trenches (10 microns width) with constant (25 microns) separation. We found that without proper calibration a microns level alignment cannot be achieved as OCT galvos have a bias error of a few hundred microns which needs to be corrected.

Another aspect of the calibration process was to calibrate the OCT axis system (X, Y and Z) to the Leica SP5 confocal fluorescence microscope axis system (SP5) to guarantee x, y, z directions are the same in all systems. In order to do so, we have constructed a circular silicon device that has 3 stretched threads (100 microns thickness) going from one point on the circle to the opposite position. Then we image it on the OCT system and the fluorescent microscope (SP5) in order to detect the direction of the scan in both modalities. This data was used in order to match the scan direction of both modalities.

Another aspect of the calibration process was to calibrate the Leica SP5 confocal fluorescence microscope tiling scan. After the sample went through the histology process, we scan it in the fluorescent microscope. In order to scan the entire slide, and to capture all the photobleached markers in the same image, multiple scans need to be taken in different XY plane locations. Right after, the collected images are stitched together (by the microscope software) to produce a single image. In order to ensure accurate stitching, we have calibrated the system using a sample made out of gel (10% pure gelatin) with a 5 by 5 grid of photobleached lines. We acquired a stitched image with all markers in it and changed the laser scanning rotation angle until all the lines were stitched properly.

B8) Optical Path Correction

Because the galvos of our OCT system are not close to the focal position of the imaging lens, the optical path length varies as a function of scan x, y position, and the OCT image exhibits an apparent curvature even when imaging a flat surface. We digitally compensated for this effect by measuring a surface that is physically almost completely flat, the bottom of a glass petri dish. We inverted the OCT-measured curvature of this glass petri dish to normalize the optical path length across the image. We fitted a quadratic equation in x and y that approximated the measured curvature to less than 0.5 um error on average. Although the exact path length correction is a function of depth, we found the measured path length change to be almost constant in depth. Hence, we use a single correction for all depths.

B9) 2D Section Imaging Instruments

We investigated several imaging modalities for imaging our photobleached alignment markers, including an automated fluorescence slide scanner, widefield microscopy, and confocal microscopy. Both the widefield and automatic slide scanning have limited resolution, restricting the minimum thickness of the photobleached line, which we would like to be as thin as possible to ensure more precise alignment. For imaging the 2D sections, we ultimately utilized a Leica SP5 confocal fluorescence microscope with a 10× air objective. We digitally set the magnification to 4×, bringing the effective pixel size to 0.721 um. The confocal pinhole is set to 74.27 um.

As we are using Alexa 680 dye as the sensitization agent, we image the fluorescence using the 633 nm laser at 50% power with a PMD detector set to 650-800 nm and digital gain at 100. We concluded this power level was optimal for the concentration of dye we had bound to the gel, yielding good contrast of the photobleached lines, without significant photobleaching we can probably double the intensity, to get higher signal but wasn't required.

A brightfield image is simultaneously collected on the SP5 microscope. The brightfield image has superior contrast within the tissue compared to the fluorescence image, and allows for spatial registration of the histology H&E image with the fluorescence image. The brightfield channel has digital gain 250 and bias −1.0.

B10) H&E Scanning and Registration

After brightfield scanning, the tissue section is sent for haematoxylin and eosin (H&E) staining. The stained H&E section is then scanned using a digital scanner at 20×. The magnification of 20× is chosen as it provides a resolution (pixel size 0.506 um) slightly below that of the brightfield and fluorescence images (pixel size 0.721 um) 100×, 40×, 5× and 4× magnification will also work but there is a compromise on resolution or time of scan. This ensures that the H&E image has more high frequency spatial information than the fluorescence image used to align the OCT. The large, full resolution H&E images are transferred to our cloud storage system. The H&E images are registered to the previously scanned brightfield and fluorescence images using a patch-wise normalized cross-correlation algorithm. When this automated algorithm fails, we fall back on a user-operated registration procedure. The user is asked to specify at least 4 corresponding points in both the brightfield and H&E image, which allows the algorithm to determine the scale, translation, and rotation transformations needed to align both images. We could do a fully manual segmentation as well, but the automation is very helpful in saving time.

B11) Sample Preparation—Gels and Dyes

An important aspect of this example is sample preparation. Initially, the sample itself was to contain an identifying pattern. There were a series of experiments to maximize the penetration of dye into the tissue. One method was by injecting the dye directly into the sample to bind the blood vessels, or injecting subcutaneously to bind to fat cells and tissue collagen. Different parameters were adjusted, such as modifying the dye concentration in DMSO or propylene glycol, or using different dyes like DRAQ™ 5 to connect the DNA of cells, SYTO™ 63, and Lidocaine/Prilocaine cream. All of the above were to get the dye to bind to endogenous structures found naturally in the tissue by binding to collagen in tissue, cell bodies or blood vessels.

The other method tried was incubating the tissue and dye together with incubation times from a few minutes to a few hours, temperature 15 degrees C. to 40, shaking, and washing. We tried to estimate how well the dye performed by measuring the homogeneity of its distribution within the tissue, how deeply it was penetrating by imaging in a fluorescent microscope, how strong of a bond it created with the tissue by photobleaching a small pattern on the sample, and seeing how long it took the photobleached area to regain signal by dye diffusion from the surrounding areas. The less signal recovered indicates a stronger likelihood the dye is bound. The resulting penetration of dye into the sample for both methods of dye injection into tissue and dye incubation with tissue was too shallow and dependent on the type of tissue.

Instead, the preferred option was for the sample to be cast in a gel. A number of parameters of the gel preparation encasing the sample were optimized for these parameters: size and frequency of undesirable gel clumps, instance and severity of breakage where tissue and gel separate, and folding visible in fluorescent imaging as bright streaks of the gel or the tissue. Several sample preparation approaches have been considered. 1) An agarose-gelatin gel where the dye attaches to the gelatin was considered. Here the gel undesirably tended to fold, and there was also undesirable separation of tissue from the gelatin. 2) An agarose-bead gel was considered, where the dye attaches to the beads and the beads are particles as described below. Here the resulting dye concentration was not high enough to uniformly stain the tissue. 3) A HistoGel™-gelatin gel was considered where the dye attaches to the gelatin. Here the dye undesirably tended to react with the HistoGel™, resulting in an undesirable loss of fluorescence signal. 4) An agar-gelatin gel where the dye attaches to the gelatin was considered. This approach worked well, and an example is described in detail below. 5) An agar-gelatin-lysine gel where the dye attaches to the lysine was considered. This approach also works but has lesser qualities than the agar-gelatin gel, with both less signal and less gel stability with increased breakage and folding. 6) A Matrigel™ that is a solubilized basement membrane preparation extracted from a mouse sarcoma so that it resembles an extracellular matrix (ECM) where the dye binds the ECM proteins was considered. This approach also works, but the Matrigel™ is a difficult material to work with because the reagent needs to be kept in cold storage and heated to high temperatures to properly gel. The main idea is that the dye has a functional N-Hydroxysuccinimide (NHS) ester group. This group tends to bind to lysine protein which have NH group that is available to react and create the ester bond. For that reason, we needed a part of the gel to have exposed NH groups. This is the role that gelatin, poly-lysine or Matrigel™ took. Another part of the story is to stabilize the gel and provide structure that prevents folding and clumping. This is where agar-gelatin combination is very useful.

In an exemplary preferred embodiment, the sample is embedded in a fluorescent gel with details as follows. The gel composition is 2% agar and 2.5% gelatin in distilled and deionized water. There are lesser alternatives to distilled and deionized water, such as phosphate buffered saline (PBS), tap water, and heavy water ($D_2O$). PBS prevents the gel from curing, creating an unwanted softer gel. Tap water and $D_2O$ lead to gels where the gelatin and agar form more clumps that can negatively affect downstream alignment processes. The 2% agar keeps the agar concentration low to prevent excess clump formation, while adding stiffness for ease of histology sample processing. Agar was preferred over agarose because it led to a more stable gel with less gel breakage and folding. Type A, Type B, and culinary grade gelatins were tested, and had similar characteristics in gel features like clumping.

The gelatin composition can range from 0.5-15%, however the former gelatin-agar combination gives the optimal gel structure for processing and fluorescence binding. Lower concentrations of gelatin are desired for a gel stiffness for both sample handling and that is able to be histologically processed.

The optimal fluorescent dye was a reagent that was easy to access and was not within the OCT laser wavelength range (but close enough to the OCT range such that one could use the same optical elements for both). The concentration had to be such that the dye fit within the photobleach time parameters, and could still retain a strong enough signal for fluorescent scanning after histological processing, meaning the dye needs to be not very photostable (comparable with Cy dye families or less photostable) to allow a fast photobleach activity. Several dyes were tested: IR 800, IR 700DX, IR 860LT, Cy7, Cy5.5, Cy5, Alexa Fluor™ 790, Alexa Fluor™ 750, Alexa Fluor™ 700, Alexa Fluor™ 680, Alexa Fluor™ 647, DyLight™ 800, DyLight™ 755, and DyLight™ 680, most of which would work. Dyes that bind NHS ester groups are preferable to lipophilic dyes because lipophilic dyes neither bind as well to the tissue nor photobleach with permanence. Alexa Fluor™ 680 was a good candidate because it was not very stable or close in wavelength to the OCT laser, making it desirable because of its ease to photobleach in a lasting manner.

Additionally, Alexa Fluor™ 680 has a molecular weight of 720 Da and can be directly bound to the NHS ester groups, however dyes with similar molecular weight will work, less then 1.5 KDa. Dyes that bind NHS ester groups can bind to the amino acid, lysine, meaning they can then be bound to any proteins put in the gel, such as collagen or protein powder, or reagents such as gelatin or poly-L-lysine. Binding to something like gelatin or poly-L-lysine is preferred because the dye is held in one place, as gelatin and poly-Lysine are bigger and cannot move much, especially if the number of repeated units is significant (over a few hundred). If the dye is only bound to small proteins, the proteins will continue diffusing around.

Gelatin is superior to poly-L-lysine in this preparation because it both binds the fluorescent dye and increases gel stability. The fluorescent dye should be bound at the beginning of the gel preparation, so it is first incubated at 50 µM with the 1% gelatin mixture for 10 minutes in a glass vial on a rotating table. The fluorescent dye concentration was optimized so the photobleaching and fluorescence could remain for a minimum of two weeks to allow for two iterations of histological processing and fluorescence scanning we found that the final concentration of about 1 micromolar is ideal for this situation, but 0.2 micromolar up to 3 micromolar will work as well. The remaining 1.5% gelatin and 2% agar are subsequently added to the existing mixture. The gelatin is added in two steps to keep the initial gelatin concentration low (below gelling point of a few %) to still allow the dye to bind to the gelatin, but prevent the gelatin from prematurely solidifying, which would create an undesired clumpier gel.

The mixture is swirled gently to mix, and then brought to a boil in a microwave. Boiling the 1% gelatin and dye mixture before the final concentrations of dye, gelatin, and agar are all mixed together has negligible differences. Heating with a microwave is preferable to a water bath to produce a gel stiffness for greater ease of extraction from the mold. The mixture should be heated continuously until it is brought to a boil, rather than in stop-and-start intervals. Intervals lead to an undesirable clumpy gel. The mixture is cooled at room temperature to a solid state, and then boiled a second time. A double boil is preferable to a single boil of the mixture for a less clumpy gel. However, the double boil step can be skipped if less gel folding is desirable.

If using particles as described herein, the particles are added and mixed by swirling gently. Which particles to use is important. Size-wise the particles must be visible in the OCT system, but small enough to be useful for improving alignment accuracy. We found sizes between 5 µm to 30 µm to be ideal in this application. Particle size also effect alignment accuracy as we can align to tolerance of the particle size. The particles should be transparent and easily cut during histological processing. Some bead particles that were considered were silica, polystyrene, gelatin, and poly (lactic-co-glycolic acid) (PLGA). Silica beads could not be histologically cut, and synthesizing gelatin microspheres is an involved process. Ultimately, PLGA particles fit the parameters best and are readily available commercially.

While still in a liquid form, the gel mixture is poured over the 2 mm×4 mm sample to embed it in a plastic cassette mold and allowed to cool to a solid gel at room temperature. Room temperature is best for a less clumpy gel in contrast to cooling in a refrigerator at 20° C. The gel should cover the sample surface at a thickness of 200-600 µm. If the gel is too shallow, the gel may break. If the gel is too thick, the above-mentioned pattern can be too deep into the gel or allow undesirable opportunities to distort, detach, or fold. Again, cooling the gel room temperature is best to avoid formation of too many unwanted clumps.

Both dipping the tissue in the gel and casting the tissue inside a gel were considered, and the greater gel thickness from casting, as described above is preferred for this example. Here dipping is dipping the tissue in gel and then quickly removing it such that a thin layer of gel surrounds the tissue. Casting is done by putting the tissue in a container and forming the gel in the container to surround the tissue. Various dye incubation times were considered. The dye binding mechanism to NHS ester groups is a quick process. We found that 10 minutes was a sufficient incubation time for this example, since there was no appreciable signal improvement for 1- or 2-hour incubation times relative to the 10-minute incubation time. While it is preferable to use a fresh preparation, we have found that this dye+gelatin mixture can be stored up to 4 days in refrigeration without excessive signal loss (i.e., signal loss was only 25% in this example after 4 days refrigerated storage).

Possible effects from unbound dye were also considered. Unbound dye can result from hydrolyzed dye or from dye that is bound to detached gelatin (i.e., gelatin that free floats in the gel and is not attached to the gel matrix). In this example, the hydrolysis rate was found to be low, in fact negligible compared to the reaction rate of dye with gelatin, but there was substantial binding of dye to detached gelatin. Adding glutaraldehyde and increasing the gelatin concentration to 5% were both independently tried, but had no substantial effect on the binding of dye to detached gelatin.

B12) First and Second Iteration Procedure for Finding Optimal Region of Alignment Marker After photobleaching and OCT imaging the sample, a generated overview of the surface of the sample is used to determine which length side of the sample the histological sectioning should begin and how deep to cut. The histology cuts are along the u-v plane, as described above. The side to start the cutting should be the straightest edge and/or the side closest to the OCT center. From that edge of the sample, the user inputs how far the full face of the edge of the sample is from the OCT center, which is used to calculate how far to request the start of sectioning. In practice, the first section location of histological sectioning is typically an undershoot by a few hundred microns of how close it is expected to be to the origin. Thus, the first iteration is cut far enough away from the origin that it can be used to calibrate where to cut a second iteration of histological sectioning, to collect a maximum of sections within usable distance to the origin. The sample cast in gel is then cut from the mold and trimmed to 3 mm×5 mm. The side to start sectioning from should be indicated by marking the opposite side, not the surface, edge with tissue-marking dye.

The sample is then fixed in preparation for histological processing. There are a variety of fixation methods including soaking in a glutaraldehyde solution, soaking in 10% neutral buffered formalin solution, or freezing. Formalin was the chosen method because glutaraldehyde fixed the sample to a point where it became too stiff for histological cutting and was a more toxic reagent. Samples are fixed for at least one hour per one millimeter of sample, although the samples are typically fixed overnight. The longer the sample is fixed in formalin, the more unbound dye is removed from the sample, allowing greater clarity of the photobleach lines.

After fixation, the sample is sent to histology to cut a first iteration of a few histological sections. Once cut, the sections are fluorescently scanned. Using the pattern, it is determined how close each section is to the origin. Once the distances from the origin of the first iteration sections are known, the distances can be used to determine where to cut the second iteration. OCT images are collected ±500 µm from the origin, so histology sections within this range are useable data. If the sections are determined to have a stack alignment that agrees with each other, they are sent to histology for H&E staining and digital scanning at 20×. Magnification at 20×, where pixel size is 0.5061, is chosen to slightly be better than the OCT resolution, and not higher magnification to keep the file size manageable.

B13) OCT System Lens Discussion

Another important aspect of this example is the OCT system that is used to image the sample. Three different systems were examined commercial off the shelf: Thorlabs Ganymede, Thorlabs Telesto and Wasatch custom made system, together with six different lenses: air objective Mitutoyo 10× and 20×, water immersion objective Olympus 10× 20×, Air objective Thorlabs LSMO2 and Thorlabs LSMO3. We chose to scan the sample using the Ganymede OCT system, and water immersion Olympus 10× lens, because it produced the best image quality in a sense of feature visibility (clear separation between the Epidermis and Dermis), sufficient lateral resolution (around 2 microns, but larger spots size can be used up to 20 microns), signal to noise ratio (in the focal plane selected lens had almost 5 times better SNR than LSMO3), a big enough field of view and depth of penetration which is dependent on OCT system central wavelength. In addition, sufficient laser power can be transmitted through it to enable the sample photobleaching (below 80% loss of laser power in the optics is preferred).

In order to further improve the image quality and speckle noise reduction, different imaging techniques were examined: Spatial Averaging, Angular Compounding, Speckle Modulation OCT, stitching multiple images in different focus depth locations, and B scan averaging. We chose to continue forward with stitching multiple images in different focus depth locations, because it generated the best image quality in a sense of speckle noise reduction (around 4 times better than LMSO3), and lateral resolution over the entire imaging depth, because the focal length is extended, by changing the focus location within the sample. Imaging time however in this method is significantly longer, (up to an hour) which is the cost.

B14) OCT z-Stitching Discussion

The high-quality stitched image requires the acquisition of multiple images in different focus depth locations. In order to do so, we can either move the sample or move the OCT scanning head. We have decided to move the sample rather than the OCT scanning head, in order to maintain the same physical focal plane Z location, and as a result to improve the stitched image quality and simplify the stitching algorithm, because the stitching algorithm performance is dependent on correct estimation of the focal plane position. In order to translate the sample, we have placed it on a moving stage (X, Y and Z translation) and optimized the Z stage steps, by minimizing the scanning time while sampling tight enough (the step size is smaller than the effective Rayleigh length), to preserve high lateral resolution.

In addition, to prevent tissue degradation we start by scanning the tissue from top to bottom, and only after we photobleach the markers. The sample was also immersed in silica oil (rather than water) to better match the tissue index of refraction, and to prevent the tissue from drying. The scanning field of view was chosen in the flattest area of the middle of the tissue sample, to avoid the distortions that occur at the tissue sample's edges and causes unwanted deformations (due to shearing) of the photobleached lines. In addition, we started the acquisition 190 microns above the tissue surface and ended it 500 microns below it. This ensures that even if the tissue is slanted, we will still capture the surface while maintaining sufficient depth imaging.

In addition, the field of view was chosen to be 1 mm by 1 mm. We optimized this parameter by drawing 2 hashtags (total of 8 photobleached lines) in two separate locations (center to center distance of 500 microns). We then used all possible lines combinations (4 lines are needed to estimate a plane), to estimate all possible planes. We found that within the 1 mm by 1 mm range all plane estimations were similar, which indicates minimal deformation/bending of the gel in that region due to histology cut, resulting in more accurate plane estimation. Field of view was also one of the parameters we optimized for while selecting a lens.

B15) Photobleaching Laser Optical Fiber Discussion

In addition, an external laser of a single wavelength was connected to the OCT system through a designated optical fiber (custom WDM, 3.3 mW at exit) in order to photobleach the sample. We customized the fiber in a way that allows the transmission of the OCT signal and the single wavelength laser with minimal power loss.

Another important aspect of this example is the scanning parameters. Using the system described above, we tested different lateral pixel sizes (1 μm and 2 μm) and chose 1 micron pixel size, which is smaller than the spot size of the OCT beam) that enables enough information on any position in the sample.

B16) Sample Orientation

The sample was placed in 45 degrees angle compared to the OCT scanning axis and the photobleached pattern, in order to get the optimal cross section of the photobleaching lines after it was cut by a histologist.

In addition, after the scan and the photobleaching had ended, we took an overview volume of the entire sample by taking multiple low-resolution volumes in the XY plane to estimate how much the histologist needs to cut before reaching the location of the markers. By doing so, the amount of data extracted from each sample is maximized.

To minimize the operator-caused scanning error, and to ensure the repeatability of the process and data collection, we have written software (written in C++ and Matlab™) that executes all of the above (sample scanning, photobleaching, overview scanning) automatically.

The invention claimed is:

1. A method of aligning a 2D image to a corresponding 3D image, the method comprising:
providing a 3D sample;
writing a predetermined pattern within the 3D sample;
cutting a 2D slice from the 3D sample after the predetermined pattern is present;
imaging the 3D sample to provide a 3D image with a first imaging modality;
imaging the 2D slice to provide a 2D image with a second imaging modality, wherein the predetermined pattern provides reference features in the 2D image; and
automatically determining a 2D section of the 3D image that corresponds to the 2D image using the reference features in the 2D image;
wherein the writing a predetermined pattern within the 3D sample comprises performing a sensitization method on the 3D sample to provide a fluorescence-sensitized sample, followed by optically writing the predetermined pattern via bleaching of fluorescence in the fluorescence-sensitized sample;
wherein the sensitization method is selected from the group consisting of: providing a genetic fluorescence marker to a biological sample, encasing the sample in a fluorescent gel, encasing the sample in a fluorescent glue, and staining the sample with a fluorescent stain.

2. The method of claim 1, wherein the predetermined pattern is formed by writing a top surface of the 3D sample with a pattern of intersecting lines, whereby the predetermined pattern is a corresponding pattern of intersecting planes.

3. The method of claim 2, wherein the pattern of intersecting lines includes a first set of lines perpendicular to a second set of lines.

4. The method of claim 3, wherein the first set of lines has a first spacing pattern between the lines that permits identification of a line from its distance ratios to adjacent lines in the 2D image.

5. The method of claim 3, wherein the second set of lines has a second spacing pattern between the lines that permits identification of a line from its distance ratios to adjacent lines in the 2D image.

6. The method of claim 3, wherein the 2D section is cut substantially perpendicular to the top surface of the 3D sample, wherein a plane of the 2D slice intersects the first set of lines and wherein the plane of the 2D slice intersects the second set of lines.

7. A method of aligning a 2D image to a corresponding 3D image, the method comprising:
providing a 3D sample;
writing a predetermined pattern within the 3D sample;
cutting a 2D slice from the 3D sample after the predetermined pattern is present;
imaging the 3D sample to provide a 3D image with a first imaging modality;
imaging the 2D slice to provide a 2D image with a second imaging modality, wherein the predetermined pattern provides reference features in the 2D image; and
automatically determining a 2D section of the 3D image that corresponds to the 2D image using the reference features in the 2D image;
wherein the predetermined pattern is formed by writing a top surface of the 3D sample with a pattern of intersecting lines, whereby the predetermined pattern is a corresponding pattern of intersecting planes;
wherein the 2D section is parametrized by a vector origin ($\vec{h}$) and two vector directions ($\vec{u}$ and $\vec{v}$), wherein a z direction is perpendicular to the top surface of the sample, wherein x and y components of $\vec{u}$, $\vec{v}$, and $\vec{h}$ are determined by least squares fitting, wherein z components of $\vec{u}$ and $\vec{v}$ are determined by assuming uniform shrinkage and no shear, and wherein a z component of $\vec{h}$ is determined from an independent measurement.

8. The method of claim 1, further comprising adding particles to the 3D sample, wherein the particles are visible in the first imaging modality, wherein the particles are visible in the second imaging modality, whereby particle features in the 2D and 3D images can be used to improve and/or quantify alignment accuracy between the 2D image and the 3D image.

9. A method of aligning a first 3D image to a second 3D image, the method comprising:
performing the method of claim 1 to align two or more planes in the second 3D image to the first 3D image.

10. The method of claim 1, wherein the first imaging modality is selected from the group consisting of: intravital microscopy, lipid-cleared 3D imaging, 3D optical imaging, optical coherence tomography, photoacoustic imaging, two photon microscopy, confocal microscopy, diffusive optical imaging and magnetic resonance imaging.

11. The method of claim 1, wherein the second imaging modality is selected from the group consisting of: histological imaging, non-histological imaging, optical microscopy, electron microscopy, and mass spectroscopy imaging.

12. The method of claim 1, wherein the sample is selected from the group consisting of: ex vivo biological sample, in vivo biological sample, and non-biological sample.

13. A method comprising:
performing the method of claim 1 multiple times on different tissue samples to provide a training data set, wherein the second imaging modality includes histology, whereby the training data set relates the first imaging modality to corresponding histology;
training a machine learning system using the training data set, whereby the machine learning system can provide synthesized histology images using the first image modality.

14. The method of claim 1, further comprising characterizing sample distortion from cutting the 2D slice and/or from performing the second imaging modality.

15. The method of claim 14, wherein the characterizing sample distortion is a time-dependent characterization of dynamic distortion.

* * * * *

UNITED STATES PATENT AND TRADEMARK OFFICE
CERTIFICATE OF CORRECTION

| | |
|---|---|
| PATENT NO. | : 12,361,656 B2 |
| APPLICATION NO. | : 17/601368 |
| DATED | : July 15, 2025 |
| INVENTOR(S) | : Yonatan Winetraub et al. |

Page 1 of 1

It is certified that error appears in the above-identified patent and that said Letters Patent is hereby corrected as shown below:

In the Specification

Column 1, Line 15 Please add the following:
This invention was made with Government support under contract OD012179 awarded by the National Institutes of Health. The Government has certain rights in the invention.

Signed and Sealed this
Twenty-first Day of October, 2025

John A. Squires
*Director of the United States Patent and Trademark Office*